(No Model.)
C. A. MALLORY.
MACHINE FOR BEATING UP NAP ON HATS.
No. 420,814. Patented Feb. 4, 1890.
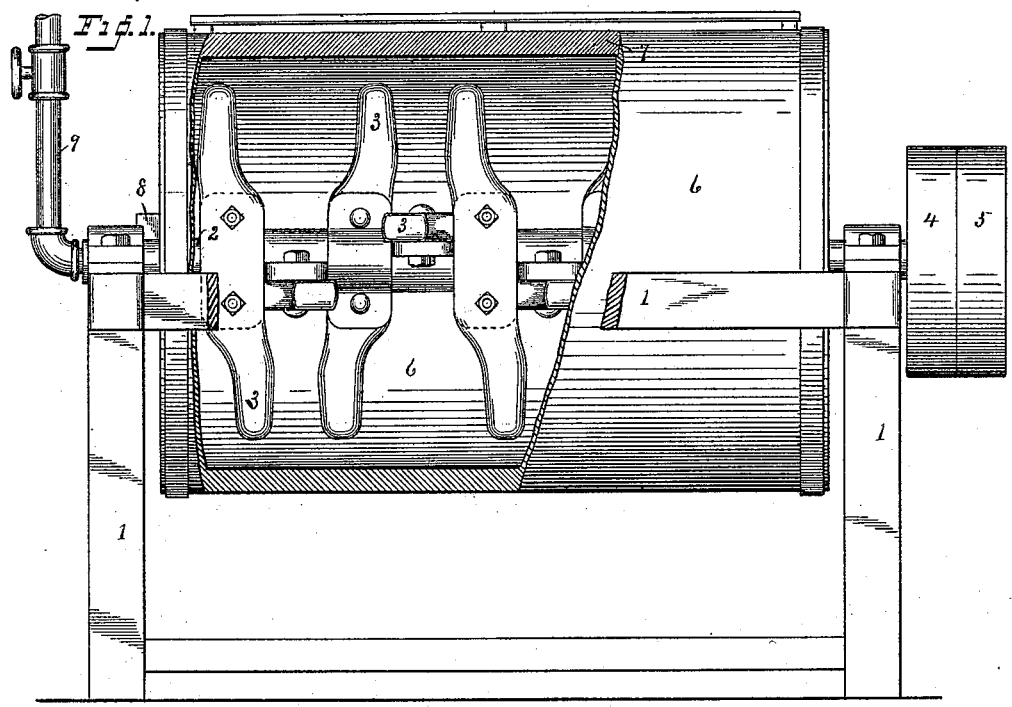
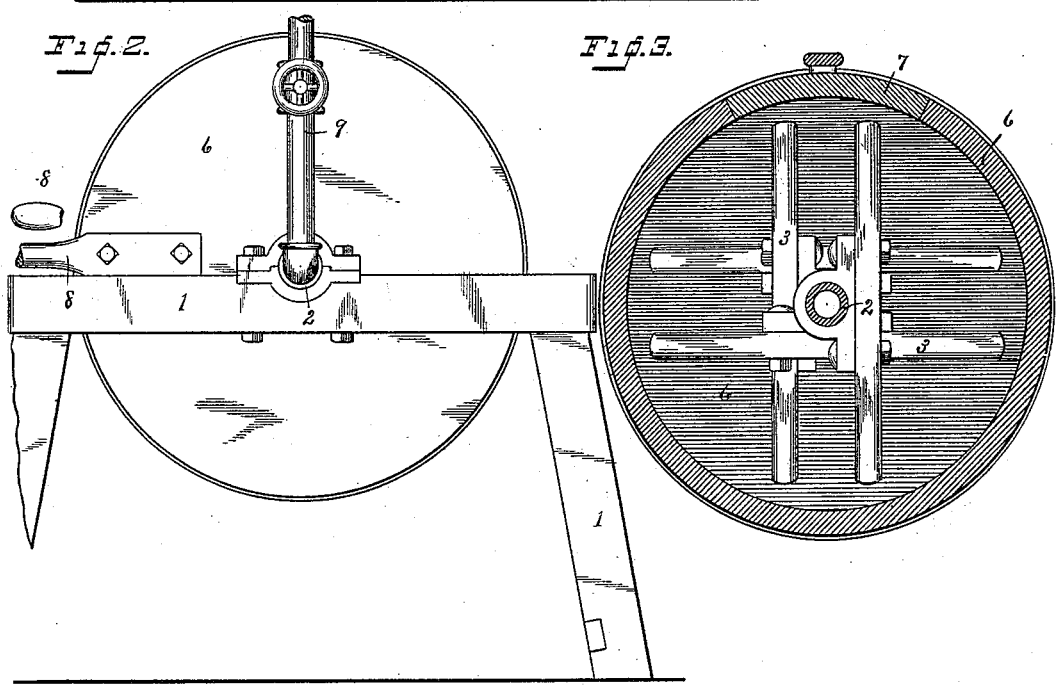
Witnesses
C. M. Newman
Azley P. Munson
Inventor
Charles A. Mallory
By F. M. Wooster
Atty.

UNITED STATES PATENT OFFICE.

CHARLES A. MALLORY, OF DANBURY, CONNECTICUT.

MACHINE FOR BEATING UP NAP ON HATS.

SPECIFICATION forming part of Letters Patent No. 420,814, dated February 4, 1890.

Application filed September 16, 1889. Serial No. 324,087. (No model.)

*To all whom it may concern:*

Be it known that I, CHARLES A. MALLORY, a citizen of the United States, residing at Danbury, in the county of Fairfield and State of Connecticut, have invented certain new and useful Improvements in Machines for Beating Up Nap on Hats; and I do hereby declare the following to be a full, clear, and exact description of the invention, such as will enable others skilled in the art to which it appertains to make and use the same.

My invention relates to the manufacture of napped hats, more especially ladies' and children's hats, and has for its object the production of novel mechanism for beating up the nap in the process of manufacture. The ordinary method of making this class of hats is as follows: The bodies, which are made of fur, are formed upon a cone in the usual manner, and are then sized and stiffened in the usual or any preferred manner. At a separate operation the fur for the nap mixed with more or less cotton—ordinarily about ten per cent.—is formed into suitable bats or strips. Portions of the bat are laid upon the portions of the body where it is desired to raise a nap, and are sprinkled with water and pounded gently with a brush to cause the bat to adhere somewhat to the body. The bodies are then scalded, which causes the pelt ends of the fur fibers of the bat to work down into the body and become firmly attached thereto, leaving the free ends of the fibers of the bat loose to form a nap upon the body, the body being of course made of a much lower grade of fur than that required for the nap. The operation of scalding may be performed in any suitable manner; but I preferably use machines of the class described and claimed in Letters Patent Nos. 244,271 and 254,349. The bodies are now ready for what is called "beating up the nap." This operation has heretofore been accomplished by alternately saturating the bodies in water, and then beating them with hand-beaters upon a plank or table until the cotton was all beaten out and the nap raised, the water being maintained at about a scalding temperature, so as to keep the bodies soft and pliable during the beating operation. It should be noted that this mode of beating up the nap consists in alternate washings and beatings. My improved machine enables me to combine the washing and beating of the bodies in one mechanical operation, which requires very much less time than the old way, avoids handling the bodies in the hot water, and, furthermore, produces a better quality of finished work.

Turning now to the drawings, Figure 1 is a side elevation of the machine, a portion of the cylindrical reservoir being broken away to show the beaters; Fig. 2, an end elevation of the reservoir, showing the dumping-handle; and Fig. 3 is a cross-section of the reservoir, showing the beaters in elevation.

1 denotes suitable frame-work; 2, a shaft journaled therein; 3, beater-arms suitably secured to the shaft; 4 and 5, respectively, tight and loose pulleys on the shaft, the former when in use imparting rotation to the shaft and beaters; 6, a cylindrical reservoir hung upon the shaft and adapted to turn freely thereon; 7, a cover for the reservoir; 8, a handle secured thereto, by which it is turned over when it is desired to dump the contents; and 9, a pipe by which scalding water or steam may be admitted to the reservoir.

I have shown the shaft as hollow, (see Fig. 3,) and have shown pipe 9 as communicating therewith. This, however, is not an essential feature of my invention. It is simply required that the reservoir be partially filled with scalding water. The water may be admitted by means of a hollow shaft or through the opening for the cover, or, if preferred, cold water may be placed in the reservoir and raised to scalding temperature by the admission of steam. It is essential that the reservoir be partially filled with scalding water, but not essential how it is placed there.

The operation is as follows: Having partially filled the reservoir with scalding water, from three to six dozen hat-bodies, to which a nap has been applied in the manner just described, are placed therein, the cover placed on, and the belt (not shown) shifted to the tight pulley to impart rotation to the shaft and beaters. The beating-arms act to beat out the cotton fiber into the water—that is, to separate the cotton from the fur fiber, leaving the outer ends of the fur fibers forming the nap free. This operation of beating and washing is continued for fifteen or twenty minutes. The belt is then shifted to the loose pulley, the cover removed, and by means of handle 8 the reservoir is turned over and its contents—water, cotton fiber, and hat-bodies—dumped out upon the floor or into a suitable receptacle. The water will be found to be full of cotton fiber, the entire amount of cotton fiber that was in the bat having been separated therefrom by the action of the beating-arms.

I have found in practice that by this mode of simultaneously beating and washing I am enabled to raise a much better nap than it is possible to raise by the old method of alternate washings and hand-beatings and in a mere fraction of the time required by the old method.

It will of course be understood that it makes no difference whether the bats are applied and nap raised upon the brims alone or upon the entire bodies, the operation being the same in each instance, it being understood that to produce a napped surface it is simply necessary to place strips of the bat upon the portions of the body where nap is desired, and then to scald the bodies, and finally to beat up the nap, at the same time washing out the cotton fiber.

Having thus described my invention, I claim—

1. In a machine of the class described, the combination, with frame-work, and a shaft journaled therein and provided with radial beating-arms, of means for imparting rotation to said shaft, and a cylindrical reservoir suspended on said shaft and turning freely thereon, said reservoir inclosing the beating-arms and being adapted to contain scalding water in which the napped hats to be beaten up are placed.

2. In a machine of the class described, the combination, with frame-work, and a shaft journaled therein and provided with radial beating-arms, of means for imparting rotation to said shaft, a cylindrical reservoir suspended on said shaft and turning freely thereon, a handle for turning the reservoir when it is desired to dump the contents, and a suitable pipe for the admission of steam or scalding water to the reservoir.

In testimony whereof I affix my signature in presence of two witnesses.

CHARLES A. MALLORY.

Witnesses:
A. M. WOOSTER,
A. B. FAIRCHILD.